2,940,974
1-SUBSTITUTED-4-[(TERTIARY- OR SECONDARY-AMINO) - ALKYLIMINO] - 1,4-DIHYDROQUINO-LINES

Alexander R. Surrey, Albany, N.Y., assignor to Sterling Drug Inc., New York, N.Y., a corporation of Delaware No Drawing. Filed June 19, 1957, Ser. No. 666,764

11 Claims. (Cl. 260—286)

This invention relates to compositions of matter of the class of basic quinoline derivatives, to their acid-addition salts, and to the preparation of these compounds.

The invention here resides in a composition of matter selected from the group consisting of: (a) a 1,4-dihydroquinoline that is substituted by a lower-alkyl or a (monocarbocyclicaryl)methyl radical at the 1-position and by a lower-(tertiary- or secondary-amino)-(polycarbon-lower-alkyl)imino radical at the 4-position, and that can be further substituted from one to two substituents selected from the group consisting of a halo, lower-alkoxy, lower-alkylmercapto, lower-alkyl, nitro and trifluoromethyl radicals at one of the normally aromatic positions of the quinoline nucleus; and (b) acid-addition salts thereof.

My compounds in free base form have the general Formula I

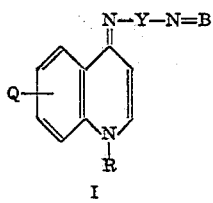

I where Q represents H or from one to two substituents at positions 3, 5, 6, 7 and 8 of the quinoline nucleus selected from the group consisting of halo, lower-alkoxy, lower-alkylmercapto, lower-alkyl, nitro and trifluoromethyl radicals, Y is a lower-alkylene radical having its connecting linkages on different carbon atoms, N=B is a member selected from the group consisting of lower-secondary-amino and lower-tertiary-amino radicals, and R is a member selected from the group consisting of lower-alkyl and (monocarbocyclic-aryl)methyl radicals.

In the above general Formula I the quinoline nucleus can be unsubstituted at the positions other than 1 and 4 or it can be substituted further at one of the normally aromatic positions of the quinoline ring, namely, 3, 5, 6, 7 or 8, by the substituents named above. When there are two substituents, they can be the same or different and can be in any of said available aromatic positions relative to each other. The halo substituents can be chloro, bromo, iodo or fluoro. The lower-alkoxy, lower-alkylmercapto and lower-alkyl substituents have preferably from one to six carbon atoms and include: methoxy, ethoxy, n-propoxy, isopropoxy, n-butoxy, isobutoxy, 2-butoxy, n-pentoxy, n-hexoxy and the like when lower-alkoxy; methylmercapto, ethylmercapto, n-propylmercapto, isobutylmercapto, n-hexylmercapto and the like when lower-alkylmercapto; and methyl, ethyl, n-propyl, isopropyl, n-butyl, n-hexyl and the like when lower-alkyl.

When representing a lower-alkyl radical, R has preferably from one to six carbon atoms and comprehends methyl, ethyl, n-propyl, isopropyl, n-butyl, isobutyl, 2-butyl, n-pentyl, isopentyl, n-hexyl, and the like.

When representing a (monocarbocyclic-aryl)methyl radical, R comprehends such radicals where monocarbocyclic-aryl, which can be designated as Ar, stands for an aryl radical of the benzene series. The aryl radical Ar includes the unsubstituted phenyl radical and phenyl radicals substituted by substituents including halo, nitro, lower-alkoxy, lower-alkyl, lower-alkylmercapto, trifluoromethyl, and the like. The substituted-phenyl radicals have preferably from one to three substituents including those given above; and, furthermore, these substituents can be in any of the available positions of the phenyl nucleus, and where more than one substituent, they can be the same or different and they can be in any of the various position combinations relative to each other. Thus R comprehends the unsubstituted-benzyl radical as well as substituted-benzyl radicals illustrated by nitrobenzyl radicals including 4-nitrobenzyl, 3-nitrobenzyl, 2-nitrobenzyl, etc.; (lower-alkoxylated)-benzyl including 3-ethoxybenzyl, 2-methoxybenzyl, 2,4-dimethoxybenzyl, 2,4,6-trimethoxybenzyl, 3,4-diethoxybenzyl, etc.; (lower-alkylated)-benzyl including 4-methylbenzyl, 3-ethylbenzyl, 2-methylbenzyl, 2,4-dimethylbenzyl, 3,4,5-trimethylbenzyl, 4-isopropylbenzyl, etc.; halogenated-benzyl including 2-chlorobenzyl, 4-chlorobenzyl, 2,4-dibromobenzyl, 3-iodobenzyl, 2,4-dichlorobenzyl, 3,4-dichlorobenzyl, 2,4,6-trichlorobenzyl, 4-fluorobenzyl, etc.; and other substituted-benzyl radicals including 3 - trifluoromethylbenzyl, 4 - methylmercapto-benzyl, and the like.

The lower-alkylene radical designated as Y preferably has from two to six carbon atoms including

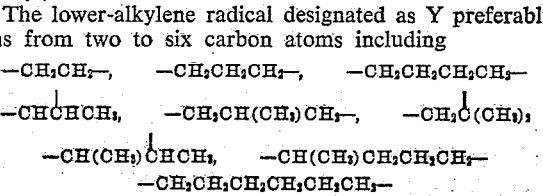

and the like.

The amino radical, represented above as N=B, comprehends both pharmacodynamically acceptable lower-secondary-amino and lower-tertiary-amino radicals having preferably from one to about twelve carbon atoms. N=B thus comprehends lower-secondary-amino radicals and includes: monocycloalkylamino radicals where the cycloalkyl group has preferably from three to six ring-carbon atoms such radicals including cyclopropylamino, cyclobutylamino, cyclopentylamino and cyclohexylamino; mono-(lower-hydroxyalkyl)amino radicals where the lower-hydroxyalkyl group has preferably two to six carbon atoms such radicals including 2-hydroxyethylamino, 3-hydroxypropylamino, 4-hydroxybutylamino, 2-hydroxypropylamino, 6-hydroxyhexylamino, etc.; mono-(lower-alkyl)amino radicals where the lower-alkyl group has preferably from one to six carbon atoms such radicals including methylamino, ethylamino, n-propylamino, isopropylamino, n-butylamino, 2-butylamino, isobutylamino, n-amylamino, n-hexylamino, etc.; mono-[(monocarbocyclic-aryl)methyl]amino radicals where the (monocarbocyclic-aryl)methyl group has the meaning illustrated above for R, such radicals including benzylamino, 2-chlorobenzylamino, 3,4-dichlorobenzylamino, 3-nitrobenzylamino, 3,4-diethoxybenzylamino, 4-isopropylbenzylamino, 2,4,6-trichlorobenzylamino, etc.; and the like. The amino radical N=B also comprehends lower-tertiary-amino radicals having two nitrogen substituents such as those illustrated above for the lower-secondary-amino radicals, with preferred tertiary-amino radicals being di-(lower-alkyl)amino radicals where the lower-alkyl radicals are alike or different and each alkyl radical has preferably from one to six carbon atoms, such dialkylamino radicals including dimethylamino, diethylamino, ethylmethylamino, diisopropylamino, ethyl-n-propylamino, di-n-butylamino, di-n-hexylamino, and the like. Further, when designating lower-tertiary-amino radicals, N=B comprehends saturated N-heteromonocyclic radicals having five to six ring atoms, illustrated by 1-piperidyl; (lower-alkylated)-1-piperidyl such as 2-methyl-1-piperiidyl, 3-ethyl-1-piperidyl, 4-methyl-1-piperidyl, 2,6-dimethyl-1-piperidyl; 1-pyrrolidyl; (lower-alkylated)-1-pyrrolidyl such as 2-methyl-1-pyrrolidyl, 3-ethyl-1-pyrrolidyl, 2,5-dimethyl-1-pyrrolidyl; 4-morpholinyl; 1-piperazyl; alkylated-1-piperazyl such as 4-methyl-1-piperazyl, 4-ethyl-1-piperazyl, 2,4,6-trimethyl-1-piperazyl; and the like.

My compounds in the form of their acid-addition salts can be written as having the general Formula II

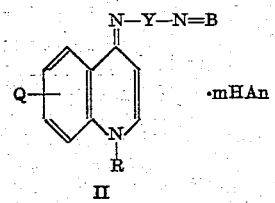

where Q, Y, N=B and R have the meanings given above; $m$ is 1 or 2; and An is an anion.

The anion designated as An, which can be any pharmacodynamically acceptable anion, for instance, chloride, bromide, iodide, sulfate, phosphate, benzenesulfonate, para-toluenesulfonate, citrate, tartrate, and the like, has no appreciable activity of its own in the high dilutions at which the acid-addition salts as a whole are effective. In particular, the anions appear to contribute nothing to the pharmacodynamic properties which inhere to the cation portion of the substituted-1,4-dihydroquinolines of the present invention. However, preferred compounds are those in which An is halide, in particular, chloride, iodide or bromide, since these are derived from readily available starting materials. By a pharmacodynamically acceptable anion, I mean any anion which is innocuous to the animal organism in pharmacodynamic doses of the acid-addition salt, so that beneficial physiological properties inherent in the cation are not vitiated by any possible side-effects ascribable to the anions; in other words, the latter do not substantially affect the pharmacodynamic properties inherent in the cations.

Concerning the structure of the acid-addition salts represented above as Formula II, the following considerations are presented. From chemical and physical data it appears that structure II (where $m$ is 1) is actually a resonance hybrid whose main contributing structures are represented as follows by A↔B:

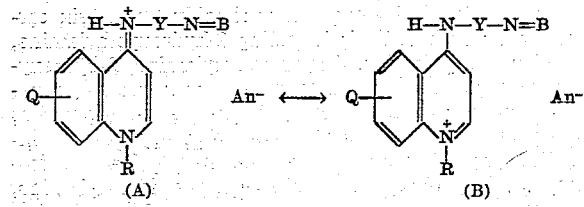

Where $m$ is 2, the situation is the same except that the second molecule of acid, HAn, is associated with the nitrogen atom of N=B. Since my compounds in free base form (Formula I) are readily obtained from their acid-addition salts by reaction with an acid-acceptor, as shown below, and since they are readily reconverted into their acid-addition salts by treatment with an acid, I prefer to represent the acid salt form by Formula II. As an illustration, I prefer to represent the monohydrochloride salt of 7-chloro-4-(2-diethylaminoethylimino)-1-methyl-1,4-dihydroquinoline by the following structural Formula IIa:

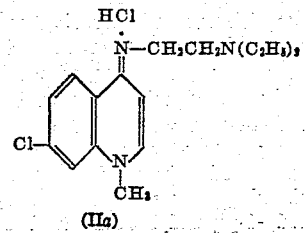

Alternatively, this compound can be named 7-chloro-4-(2-diethylaminoethylamino)-1-methylquinolinium chloride or 7-chloro-4-(2-diethylaminoethylamino)quinoline monomethochloride and can be represented by the structural Formula IIb:

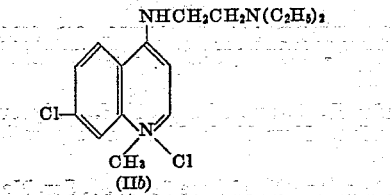

Thus, it is to be understood that although I prefer to represent the acid-addition salt form of my compounds by the structural formula designated above as II, i.e., an acid-addition salt of a 1-substituted-4-(secondary- or tertiary-amino-alkylimino)-1,4-dihydroquinoline where $m$ is 1, this 4-imino-1,4-dihydroquinoline structure actually represents only one of the contributing members of a resonance hybrid; and, further, it is to be understood that the salt form of my invention comprehends not only this 4-imino-1,4-dihydroquinoline structure (as specifically illustrated above as IIa) but also other contributing members of the resonance hybrid including the 1-substituted-4-(secondary- or tertiary-amino-alkylamino)-quinolinium salt structure (as specifically illustrated above as IIb).

The compounds of Formula II are prepared by reacting the corresponding 4-haloquinolinium halide having the Formula III

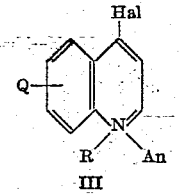

where Q and R have the meanings designated above, An is a halide ion and Hal is a chloro, bromo or iodo radical, with one molar equivalent of an alkylenediamine of the formula $H_2N-Y-N=B$ and, if the compounds of Formula I are desired, then reacting the resulting hydrohalide salt of the 1-substituted-4-(secondary- or tertiary-amino-alkylimino)-1,4-dihydroquinoline (Formula II where $m$ is 1) with an acid-acceptor to yield the product in free base form (Formula I). Thus, the reaction of 1-(2-bromobenzyl)-4,7-diiodo-6-methoxyquinolinium iodide with 2-diethylaminoethylamine yields the hydriodide of 1-(2-bromobenzyl)-7-iodo-4-(2-diethylaminoethylimino)-6-methoxy-1,4-dihydroquinoline which when reacted with an acid-acceptor yields 1-(2-bromobenzyl)-7-iodo-4-(2-diethylaminoethylimino)-6-methoxy-1,4-dihydroquinoline.

The step of reacting the 4-haloquinolinium halide (Formula III) with the alkylenediamine $H_2N-Y-N=B$ is carried out preferably by heating the reactants at a temperature between about 50° C. and 150° C., preferably between about 75 and 125° C.; the reaction can be run at room temperature, but it takes longer. The reaction is preferably carried out in an organic solvent which is inert under the conditions of the reaction as for example, ethanol, and the like. If an inert solvent is used, the product usually separates from solution upon cooling, or can be obtained by concentration of the solution.

The step of reacting the hydrohalide acid-addition salt (Formula II) with an acid acceptor is carried out at room temperature or by heating, if necessary, up to a temperature of about 100° C. The reaction is preferably carried out in a solvent as for example, water or a lower-alkanol, e.g., ethanol or methanol, or a mixture of water and a lower-alkanol. The purpose of the acid-acceptor is to take up the hydrogen halide (or HAn) which is split out during the course of the reaction. The acid-acceptor is a basic substance which preferably forms freely watersoluble by-products easily separable from the product of the reaction, including for example, sodium hydroxide, potassium hydroxide, sodium carbonate, potassium carbonate, sodium acetate, sodium alkoxides, potassium alkoxides, sodium amide, and the like.

The compounds of Formulas I and II where R is a (monocarbocyclic-aryl)methyl radical, i.e., $CH_2Ar$, and where Y is $CH_2CH_2$ and N=B is a lower-tertiary-amino radical can also be prepared by reacting the corresponding 4-(2-tertiary-aminoethylamino)quinoline of the Formula IV

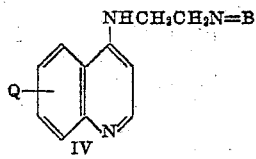

where Q has the meaning designated above, with one molar equivalent of an ester of the formula $ArCH_2$—An and reacting the resulting HAn acid-addition salt (Formula II: $m$ is 1, Y is $CH_2CH_2$ and N=B is lower-tertiary-amino) with an acid acceptor to yield the product in free base form (Formula I). Thus, 6,8-dimethoxy-4-[2-(1-piperidyl)ethylimino]-1-(2-methoxybenzyl)-1,4 - dihydroquinoline is obtained by reacting 6,8-dimethoxy-4-[2-(1-piperidyl)ethylamino]quinoline with one molar equivalent of 2-methoxybenzyl chloride and reacting the resulting hydrochloride acid-addition salt of 6,8-dimethoxy-4-[2 - (1 - piperidyl)ethylimino] - 1 - (2 - methoxybenzyl)-1,4-dihydroquinoline with an acid-acceptor.

The reaction of the 4-(tertiary-aminoethylamino)-quinoline (Formula IV) with one molar equivalent of the ester $ArCH_2$—An is carried out by heating the reactants at a temperature between about 50° C. and 150° C., preferably between about 80° C. and 120° C. The reaction is preferably carried out in an organic solvent which is inert under the conditions of the reaction as for example, acetonitrile, acetone, ethanol, and the like. If an inert solvent is used, the product usually separates from solution upon cooling, or can be obtained by concentration of the solution. The reaction takes place most readily with arylmethyl esters $ArCH_2$—An where An is the anion of a strong acid, e.g., halide, sulfate, phosphate, and the like. The chloride, bromide or iodide are preferred because of the more ready availability of the requisite arylmethyl halides.

The acid-addition salts of my compounds (Formula II) where An represents a halide ion are preferably prepared directly by the procedures described above, which result in the formation of the monohydrohalides. The dihydrohalides are obtained by treating the corresponding monohydrohalides with a molar equivalent of a hydrohalic acid. Salts where An is the anion of other strong acids or of a weak acid can be prepared by treating the corresponding compound in free base form (Formula I) with the appropriate acid, or by treating an acid-addition salt (Formula II) prepared directly as noted above with an anion exchange resin saturated with the desired anion. Appropriate acid-addition salts are those derived from mineral acids including hydrochloric acid, hydrobromic acid, hydriodic acid, nitric acid, sulfuric acid and phosphoric acid; and organic acids including acetic acid, citric acid, lactic acid, and tartaric acid. The acid-addition salts are prepared from the free base form (Formula I) by dissolving the base (I) in an aqueous solution containing the appropriate acid and isolating the salt by evaporating the solution, or by reacting the free base and acid in an organic solvent, in which case the salt separates directly or can be obtained by concentrating the solution.

Evaluation of the compounds of my invention by standard test procedures has shown that they have useful pharmacodynamic properties, such as hypotensive activity. Further, they are useful as intermediates, for example, in the preparation of some corresponding 1-substituted-4-[lower - (quaternary-ammonium) - alkylimino] - 1,4-dihydroquinolines which are disclosed and claimed in my copending applications Serial No. 666,765, filed June 19, 1957 and Serial No. 666,785, filed June 19, 1957.

The following examples will further illustrate the invention, without the latter being limited thereto.

EXAMPLE 1

A. *4-[lower-(tertiary- or secondary-amino)-alkylamino]-quinolines*

These intermediate compounds in the form of their free bases and acid-addition salts are generally known in the art. They are prepared by reacting the appropriate 4-haloquinoline with a diamine of the formula

where Y and N=B have the meanings given above. New compounds of this type that I prepared as intermediates for the synthesis of the 4-[lower-(tertiary- or secondary-amino) - alkylimino]-1-substituted-1,4-dihydroquinolines of my invention are given in Table A.

TABLE A

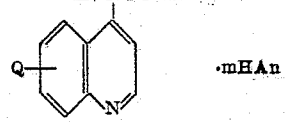

| Q | Y—N=B | mHAn | M.P., ° C., corr. |
|---|---|---|---|
| 7-Cl | $CH_2CH_2NHCH_3$ | 2HCl | a 250.0–252.2 |
| 7-Cl | $CH_2CH_2NHC_3H_7$-n | 2HCl | a 278.2–280.6 |
| 7-Cl | $CH_2CH_2N(CH_3)_2$ | base | a 121.0–122.8 |
| 7-Cl | $CH_2CH_2N(C_2H_5)_2$ | 2HCl | b,c 279.4–283.0 |
| 7-Cl | $CH(CH_3)CH_2CH_2CH_2NC_4H_8O$ d | | 154.5–155.0 |
| 5-Cl | $CH_2CH_2N(CH_3)_2$ | $2H_3PO_4$ | b 252.4 |
| 5-Cl | $CH_2CH_2N(C_2H_5)_2$ | $2H_3PO_4$ | 226.4–228.6 |
| 5-Cl | $CH_2CH_2CH_2N(CH_3)_2$ | $2H_3PO_4$ | 233.6–236.2 |
| 5-Cl | $CH_2CH_2CH_2N(C_2H_5)_2$ | $2H_3PO_4$ | 244.6–247.4 |
| 5-Cl | $CH_2CH_2N(C_4H_9$-n$)_2$ | $2H_3PO_4$ | 214.6–217.0 |
| 3-Cl | $CH_2CH_2N(C_2H_5)_2$ | 2HCl | 219.0–226.4 |
| 3,7-di-Cl | $CH_2CH_2N(C_2H_5)_2$ | base | 67.2– 73.4 |
| 6,7-di-Cl | $CH_2CH_2N(C_2H_5)_2$ | base | 116.4–118.0 |
| 8-OCH$_3$ | $CH_2CH_2N(C_2H_5)_2$ | base | 126.2–128.8 |
| 6-OCH$_3$ | $CH_2CH_2N(C_2H_5)_2$ | base | 94.8– 98.8 |
| H | $CH_2CH_2N(CH_3)_2$ | 2HCl | 224.8–227.0 |
| H | $CH_2CH_2N(C_2H_5)_2$ | $2HCl.H_2O$ | 135.6–138.8 |
| H | $CH_2CH_2N(C_2H_5)_2$ | 2HCl | 138.6–143.6 |
| 7-CH$_3$ | $CH_2CH_2N(C_2H_5)_2$ | base | 99.0–103.6 | a Base shown by Tarbell et al., JACS 68, 1217 (1946).
b With decomposition.
c Base and diphosphate shown by Surrey et al., JACS 68, 113 (1946).
d $NC_4H_8O$=4-morpholinyl.

The acid-addition salts of the basic quinolines of Table A were converted into their free base form for use as intermediates in the preparation of the compounds of the invention. This was done by dissolving the salt in water, adding an alkaline agent such as ammonium hydroxide to the aqueous solution to liberate the basic quinoline, extracting the basic quinoline with an organic solvent such as chloroform and removing the organic solvent by distilling in vacuo to leave the basic quinoline.

B. *1-arylmethyl - 4 - [lower - (tertiary - amino) - ethylimino]-1,4-dihydroquinolines*

The preparation of these compounds in the form of their acid-addition salts is illustrated by the following preparation of the hydrochloride of 7-chloro-1-(2-chlorobenzyl)-4 - (2 - diethylaminoethylimino) - 1,4 - dihydroquinoline: A solution containing 5.0 g. of 7-chloro-4-(2-diethylaminoethylamino)quinoline, 2.9 g. of 2-chlorobenzyl chloride and 25 cc. of acetonitrile was refluxed for five hours and then cooled to about 6° C. and allowed to stand forty-eight hours. The precipitate was collected and recrystallized from acetonitrile to yield 3.4 g. (43% yield) of the product, 7-chloro-1-(2-chlorobenzyl)-4-(2 - diethylaminoethylimino) - 1,4 - dihydroquinoline hydrochloride, M.P. 194.0–207.6° C. (corr.).

*Analysis.*—Calcd. for $C_{22}H_{25}Cl_2N_3 \cdot HCl$: Cl⁻, 8.08; N, 9.58. Found: Cl⁻, 7.77; N, 9.63.

Alternatively, as discussed hereinabove, 7-chloro-1-(2-chlorobenzyl)-4 - (2 - diethylaminoethylimino) - 1,4-dihydroquinoline hydrochloride can be called 7-chloro-1-(2 - chlorobenzyl) - 4 - (2 - diethylaminoethylamino)-quinolinium chloride or 7-chloro-4-(2-diethylaminoethylamino)quinoline mono-(2-chlorobenzochloride).

Other 1 - arylmethyl - 4 - [lower - (tertiary-amino)-ethylimino]-1,4-dihydroquinolines that can be prepared following the above procedure using one molar equivalent each of the appropriate 4-(tertiary-aminoethylamino)-quinoline and arylmethyl ester of a strong acid include: 6,7 - dichloro - 4 - [2 - (1 - piperidyl)ethylimino] - 1 - (2 - methoxybenzyl) - 1,4 - dihydroquinoline hydrochloride using 6,7-dichloro-4-[2-(1-piperidyl)-ethylamino]quinoline and 2-methoxybenzyl chloride; 7-bromo - 4 - (2 - di - n - hexylaminoethylimino) - 1-(2,4 - dimethoxybenzyl) - 1,4 - dihydroquinoline hydrobromide using 7 - bromo - 4 - (2 - di - n - hexylaminoethylamino)quinoline and 2,4 - dimethoxybenzyl bromide; 1 - (2,4 - dibromobenzyl) - 4 - [2 - (N - ethyl-N - 2 - hydroxyethylamino)ethylimino] - 3 - nitro - 1,4-dihydroquinoline hydrobromide using 4 - [2 - (N - ethyl-N - 2 - hydroxyethylamino)ethylamino] - 3 - nitroquinoline and 2,4 - dibromobenzyl bromide; 1-(2 - chloro-4-methoxybenzyl) - 6,8 - dimethoxy - 4 - [2 - (4 - methyl-1 - piperidyl)ethylimino] - 1,4 - dihydroquinoline hydrochloride using 6,8 - dimethoxy - 4 - [2 - (4 - methyl-1 - piperidyl)ethylamino]quinoline and 2 - chloro - 4-methoxybenzyl chloride; 4 - [2 - (N - benzyl - N - ethylamino)ethylimino] - 8 - n - butoxy - 1 - (2,4,6 - trichlorobenzyl) - 1,4 - dihydroquinoline hydrochloride using 4 - [2 - (N - benzyl - N - ethylamino)ethylamino]-8-n-butoxyquinoline and 2,4,6-trichlorobenzyl chloride; 4 - [2 - (4 - morpholinyl)ethylimino] - 6 - n - hexoxy-1 - (3 - trifluoromethylbenzyl) - 1,4 - dihydroquinoline hydrochloride using 4-[2-(4-morpholinyl)ethylamino]-6-n-hexoxyquinoline and 3-trifluoromethylbenzyl chloride; 1 - (2 - chlorobenzyl) - 4 - [2 - (N - ethyl - N-methylamino)ethylamino] - 8 - isobutylmercapto - 1,4-dihydroquinoline hydrochloride using 4 - [2 - (N - ethyl-N - methylamino)ethylamino] - 8 - isobutylmercaptoquinoline and 2-chlorobenzyl chloride; 7-chloro-1-(2-chlorobenzyl) - 4 - (2 - diethylaminoethylimino) - 6-methoxy - 1,4 - dihydroquinoline hydrochloride using 7-chloro-4-(2-diethylaminoethylamino)-6 - methoxy-quinoline and 2-chlorobenzyl chloride; and the like. These compounds are converted into their free base form by reaction with an acid-acceptor according to the procedure given in Example 2 for the conversion of 7-chloro - 1 - (2 - chlorobenzyl) - 4 - (2 - diethylaminoethylimino) - 1,4 - dihydroquinoline hydrochloride into its corresponding free base by reaction with aqueous sodium hydroxide solution.

EXAMPLE 2

*7-chloro-1-(2-chlorobenzyl)-4-(2-diethylaminoethylimino)-1,4-dihydroquinoline*

Thirty grams of 7-chloro-1-(2-chlorobenzyl)-4-(2-diethylaminoethylimino)quinoline hydrochloride were dissolved in 400 cc. of warm water. The solution was made basic by the slow addition of 74 cc. of 10% aqueous sodium hydroxide solution. The oil which separated solidified on cooling and triturating. The solid was recrystallized from n-hexane to yield 22.9 g. (83% yield) of the product, 7-chloro-1-(2-chlorobenzyl)-4-(2-diethylaminoethylimino) - 1,4 - dihydroquinoline, M.P. 106.0–107.6° C. (corr.).

*Analysis.*—Calcd. for $C_{22}H_{25}Cl_2N_3$: Cl, 17.63; N, 10.44. Found: Cl, 17.46; N, 10.27.

Treatment of 7-chloro-1-(2-chlorobenzyl)-4-(2-diethylaminoethylimino)quinoline with an excess of ethanolic hydrogen chloride as in Example 6B yields its dihydrochloride; and, similarly, treatment with only one molar equivalent of hydrogen chloride yields the monohydrochloride, the same salt used above to prepare the free base form by reaction with aqueous sodium hydroxide solution.

EXAMPLE 3

*5-chloro-1-(2-chlorobenzyl)-4-(2-diethylaminoethylimino)-1,4-dihydroquinoline hydrochloride*

This preparation was carried out following the procedure described in Example 1B using 5 g. of 5-chloro-4-(2-diethylaminoethylamino)quinoline, 2.9 g. of 2-chlorobenzyl chloride, 25 cc. of acetonitrile and a reflux period of twelve hours. There was thus obtained 5.4 g. (68% yield) of the product, 5-chloro-1-(2-chlorobenzyl)-4 - (2 - diethylaminoethylimino) - 1,4 - dihydroquinoline hydrochloride, M.P. 205.0° C. (corr.) with decomposition when recrystallized from isopropanol.

*Analysis.*—Calcd. for $C_{22}H_{25}Cl_2N_3 \cdot HCl$: Cl⁻, 8.08; N, 9.58. Found: $H_2O$, 3.64; Cl⁻, 7.96 (dry basis); N, 9.50 (dry basis).

EXAMPLE 4

*7 - chloro - 1 - (2 - chlorobenzyl) - 4 - [2 - (N - 2-chlorobenzyl - N - ethylamino) - ethylimino] - 1,4-dihydroquinoline hydrochloride*

This preparation was carried out following the procedure described in Example 1B using 3.0 g. of 7-chloro-4 - [2 - (N - 2 - chlorobenzyl - N - ethylamino)ethylamino]quinoline, 1.6 g. of 2-chlorobenzyl chloride, 25 cc. of acetonitrile and a reflux period of twenty-four hours. There was thus obtained 2.6 g. (59% yield) of the product, 7 - chloro - 1 - (2 - chlorobenzyl) - 4 - [2-(N - 2 - chlorobenzyl - N - ethylamino)ethylimino] - 1, 4-dihydroquinoline hydrochloride, M.P. 199.8–201.4° C. (corr.) when recrystallized once from acetonitrile and once from isopropanol.

*Analysis.*—Calcd. for $C_{27}H_{26}Cl_3N_3 \cdot HCl$: Cl, 26.45; N, 7.85. Found: Cl, 26.37; N, 7.92.

EXAMPLE 5

*7 - chloro - 1 - (2 - chlorobenzyl) - 4 - [2 - (4 - morpholinyl)ethylimino]-1,4-dihydroquinoline hydrochloride*

This preparation was carried out following the procedure described in Example 1B using 5.0 g. of 7-chloro-4 - [2 - (4 - morpholinyl)ethylamino]quinoline, 2.4 g. of 2-chlorobenzyl chloride, 25 cc. of acetonitrile and a reflux period of twenty-four hours. There was thus obtained 7.7 g. (85% yield) of product, 7-chloro-1-(2- chlorobenzyl) - 4 - [2 - (4 - morpholinyl)ethylimino]-1,4-dihydroquinoline hydrochloride, M.P. 238.2–241.2° C. (corr.).

Analysis.—Calcd. for $C_{22}H_{23}Cl_2N_3O \cdot HCl$: Cl−, 7.83; N, 9.28. Found: Cl−, 7.80; N, 9.12.

EXAMPLE 6

A. 1-arylmethyl-4-haloquinolinium halides

The preparation of these intermediates is illustrated by the following preparation of 7-chloro-1-(2-chlorobenzyl)-4-iodoquinolinium iodide: a reaction mixture containing 80 g. of 4,7-dichloroquinoline, 128 g. of 2-chlorobenzyl chloride, 177 g. of sodium iodide and 1200 cc. of acetone was refluxed for twenty-four hours with stirring. The reaction mixture was allowed to cool and the precipitate was collected; washed successively with acetone, water and acetone. There was thus obtained 130 g. (60% yield) of 7-chloro-1-(2-chlorobenzyl)-4-iodoquinolinium iodide, M.P. 208–209° C. (uncorr.).

Following the above procedure using an equivalent quantity of 4,5-dichloroquinoline in place of 4,7-dichloroquinoline, the product obtained was 5-chloro-1-(2-chlorobenzyl)-4-iodoquinolinium iodide, M.P. 201–202° C. with decomposition.

Anal.—Calcd. for $C_{16}H_{10}Cl_2IN \cdot HI$: C, 35.45; H, 2.04; I−, 23.42. Found: C, 35.28; H, 2.30; I−, 25.6.

Other 1-arylmethyl-4-haloquinolinum iodides that can be prepared following the above procedure using the appropriate 4-haloquinoline, benzyl halide and sodium iodide include: 3,7-dichloro-4-iodo-1-(3-nitrobenzyl) quinolinium iodide using 3,4,7-trichloroquinoline, 3-nitrobenzyl chloride and sodium iodide; 7-bromo-1-(2,4-dimethoxybenzyl)-4-iodoquinolinium iodide using 4,7-dibromoquinoline, 2,4-dimethoxybenzyl bromide and sodium iodide; 8-chloro-4-iodo-1-(2,4,6-trimethoxybenzyl) - quinolinium iodide using 4,8-dichloroquinoline, 2,4,6-trimethoxybenzyl chloride and sodium iodide; 1-(3-ethylbenzyl)-4-iodo-7-trifluoromethylquinolinium iodide using 4-iodo-7-trifluoromethyl-quinoline, 3-ethylbenzyl chloride and sodium iodide; 4-iodo-7-methylmercapto-1- (2 - methylmercaptobenzyl)quinolinium iodide using 4-chloro-7-methylmercaptoquinoline, 2-methylmercaptobenzylchloride and sodium iodide; and the like.

B. 7-chloro-1-(2-chlorobenzyl)-4-(2-dimethylaminoethylaminoethylimino)-1,4-dihydroquinoline dihydrochloride A solution containing 5.28 g. of 2-dimethylaminoethylamine in 50 cc. of absolute ethanol was heated and treated portionwise with stirring with 11 g. of 7-chloro-1(2-chlorobenzyl)-4-iodoquinolinium iodide. When a clear solution had resulted, it was cooled. The resulting precipitate was collected and recrystallized from ethanol-water to yield 7.5 g. (73%) of 7-chloro-1-(2-chlorobenzyl)-4-(2-dimethylaminoethylimino)-1,4-dihydroquinoline hydriodide, M.P. 230–231° C. (uncorr.). This hydriodide salt was converted to the corresponding imino base by dissolving 3.5 g. of it in ethanol-water and treating the resulting solution with excess 5% aqueous sodium hydroxide solution. Addition of water yielded a precipitate which was collected, the yield being 2.7 g. (100%) of 7-chloro-1-(2-chlorobenzyl) - 4 - (2 - dimethylaminoethylimino) - 1,4 - dihydroquinoline, M.P. 144–145° C. (uncorr.).

Other 1 - arylmethyl-4-(tertiary-aminoalkylimino)-1,4-dihydroquinolines that can be prepared following the above procedure using the appropriate 1-arylmethyl-4-iodoquinolinium iodide and tertiary-aminoakylamine include: 3,7 - dichloro-4-(4 - diethylaminobutylimino)-1-(3-nitrobenzyl)-1,4-dihydroquinoline using 3,7 - dichloro - 4-iodo-1-(3-nitrobenzyl)quinolinium iodide and 4 - diethylaminobutylamine; 7 - bromo - 4 - ( 2- diethylaminoethylimino)-1-(2,4-dimethoxybenzyl)-1,4 - dihyroquinoline using 7-bromo-1-(2,4-dimethoxybenzyl)-4-iodoquinolinium iodide and 2-diethylamino-ethylamine; 8-chloro-4-[3-(1-pyrrolidyl)propylimino]-1-(2,4,6 - trimethoxybenzyl) - 1, 4 - dihydroquinoline using 8 - chloro - 4-iodo-1-(2,4,6-trimethoxybenzyl)quinolinium iodide and 3-(1-pyrrolidyl)-propylamine; 4-(3-diethylamino-2 - propylimino) - 1 - (3-ethylbenzyl)-7-trifluoromethyl-1,4-dihydroquinoline using 1-(3-ethylbenzyl)-4-iodo - 7 - trifluoromethylquinolinium iodide and 3-diethylamino-2-propylamine; 4-[3-(N-cyclohexyl-N-methylamino)propylimino] - 7-methylmercapto-1-(2-methylmercaptobenzyl)-1,4-dihydroquinoline using 4-iodo-7-methylmercapto - 1 - (2-methylmercaptobenzyl) quinolinium iodide and 3-(N-cyclohexyl-N-methylamino) propylamine; and the like.

7-chloro-1-(2-chlorobenzyl) - 4 - (2 - dimethylaminoethylimino)-1,4-dihydroquinoline (2.7 g.) in isopropanol solution was treated with ethanolic hydrogen chloride until the solution was acidic. The solution was cooled and the resulting precipitate was collected and recrystallized from isopropanol to yield 2.3 g. (65%) of product, 7-chloro-1-(2-chlorobenzyl) - 4 - (2 - dimethylaminoethylimino)-1,4-dihydroquinoline dihydrochloride in the form of its monoisopropanolate, M.P. 253.8–255.4° C. (corr.).

Anal.—Calcd. for $C_{20}H_{21}Cl_2N_3 \cdot 2HCl \cdot C_3H_7OH$: Cl, 27.96; N, 8.28. Found: $H_2O$, 1.30; Cl, 27.90 (D.B.); N, 8.50 (D.B.).

By substitution of the hydrogen chloride in the preceding example with an excess of hydrogen bromide, phosphoric acid, sulfuric acid, tartaric acid or methanesulfonic acid, there can be obtained 7-chloro-1-(2-chlorobenzyl)-4-(2-dimethylaminoethylimino) - 1,4 - dihydroquinoline dihydrobromide, diphosphate, disulfate, ditartrate or dimethanesulfonate, respectively.

EXAMPLE 7

7-chloro-1-(2-chlorobenzyl)-4-(2-di-n-butylaminoethylimino)-1,4-dihydroquinoline hydrochloride This preparation was carried out following the procedure described in Example 1B using 1.15 g. of 7-chloro-4-(2-di-n-butylaminoethylamino)quinoline, 0.54 g. of 2-chlorobenzyl chloride, 25 cc. of acetonitrile and a reflux period of twenty-four hours. There was thus obtained 1.06 g. (62% yield) of the product, 7-chloro-1-(2-chlorobenzyl)-4-(2-di-n-butylaminoethylimino) - 1,4 - dihydroquinoline hydrochloride, M.P. 179.2–183.2° C. (corr.) when recrystallized from acetone.

Anal.—Calcd. for $C_{26}H_{33}Cl_2N_3 \cdot HCl$: Cl−, 7.17; Cl, 21.51. Found: Cl−, 7.13; Cl, 21.03.

EXAMPLE 8

5-chloro-1-(2-chlorobenzyl)-4-(2-di-n-butylaminoethylimino)-1,4-dihydroquinoline hydrochloride This preparation was carried out following the procedure described in Example 1B using 2 g. of 5-chloro-4-(2-di-n-butylaminoethylamino)quinoline, 1 g. of 2-chlorobenzyl chloride, 50 cc. of acetonitrile and a reflux period of twenty-four hours. There was thus obtained 1 g. (34% yield) of the product, 5-chloro-1-(2-chlorobenzyl)-4-(2-di-n-butylaminoethylimino) - 1,4 - dihydroquinoline hydrochloride, M.P. 206.8–207.7° C. (corr.) when recrystallized from acetonitrile-ethyl acetate.

Anal.—Calcd. for $C_{26}H_{33}Cl_2N_3 \cdot HCl$: Cl, 21.49; N, 8.49. Found: Cl, 21.36; N, 8.20.

EXAMPLE 9

5-chloro-1-(2-chlorobenzyl)-4-[2-(4-morpholinyl)ethylimino]-1,4-dihydroquinoline hydrochloride This preparation was carried out following the procedure described in Example 1B using 5.0 g. of 5-chloro-4-[2-(4-morpholinyl)ethylamino]quinoline, 2.42 g. of 2-chlorobenzyl chloride, 25 cc. of acetonitrile and a reflux period of twenty-four hours. There was thus obtained 6.3 g. (82% yield) of the product, 5-chloro-1-(2-chlorobenzyl)-4-[2-(4-morpholinyl)ethyl-imino] - 1,4-dihydroquinoline hydrochloride, M.P. 215.6–221.4° C. (corr.) when recrystallized from ethanol-ethyl acetate.

Anal.—Calcd. for $C_{22}H_{23}Cl_2N_3O \cdot HCl$: Cl−, 7.83; N, 9.28. Found: Cl−, 7.72; N, 9.02.

EXAMPLE 10

*1-(2-chlorobenzyl)-4-(2-diethylaminoethylimino)-6-methoxy-1,4-dihydroquinoline hydrochloride*

This preparation was carried out following the procedure described in Example 1B using 5.0 g. of 4-(2-diethylaminoethylamino)-6-methoxyquinoline, 2.7 g. of 2-chlorobenzyl chloride, 25 cc. of acetonitrile and a reflux period of twenty-four hours. There was thus obtained 4.7 g. (59% yield) of the product, 1-(2-chlorobenzyl)-4-(2-diethylaminoethylimino)-6-methoxy-1,4-dihydroquinoline hydrochloride, M.P. 223.8–228.4° C. (corr.) when recrystallized from isopropanol.

*Anal.*—Calcd. for $C_{23}H_{28}ClN_3O \cdot HCl$: $Cl^-$, 8.16; N, 9.67. Found: $Cl^-$, 8.00; N, 9.64.

EXAMPLE 11

*7-chloro-1-(2-chlorobenzyl)-4-(3-dimethylaminopropylimino)-1,4-dihydroquinoline dihydrochloride*

This preparation was carried out following the procedure described in Example 6B using 11 g. of 7-chloro-1-(2-chlorobenzyl)-4-iodoquinolinium iodide, 6.3 g. of 3-dimethylaminopropylamine and 50 cc. of absolute ethanol. There was thus obtained 7.5 g. (71% yield) of 7-chloro-1-(2-chlorobenzyl)-4-(3-dimethylaminopropylimino)-1,4-dihydroquinoline hydriodide, M.P. 210–211° C. (uncorr.).

The hydriodide (3 g.) was dissolved in ethanol-water and treated with excess 5% sodium hydroxide solution to give 2 g. of 7-chloro-1-(2-chlorobenzyl)-4-(3-dimethylaminopropylimino)-1,4-dihydroquinoline, M.P. 67–68° C. (uncorr.). This imino base was converted into its dihydrochloride following the procedure given in Example 6B. There was thus obtained 1.5 g. (55% yield) of 7-chloro-1-(2-chlorobenzyl)-4-(3-dimethylaminopropylimino)-1,4-dihydroquinoline dihydrochloride, M.P. 241.8–246.8° C. (corr.) with decomposition when recrystallized from isopropanol.

*Anal.*—Calcd. for $C_{21}H_{23}Cl_2N_3 \cdot 2HCl$: $Cl^-$, 15.4; N, 9.11. Found: $Cl^-$, 15.11; N, 8.89.

EXAMPLE 12

A. *7-chloro-1-(2-chlorobenzyl)-4-(4-diethylaminobutylimino)-1,4-dihydroquinoline hydriodide*

Ten grams of 4-diethylaminobutylamine were dissolved in 25 cc. of ethanol and the solution was added to a suspension of 12.5 g. of 7-chloro-1-(2-chlorobenzyl)-4-iodoquinolium iodide in 50 cc. of ethanol. The reaction mixture was warmed on a steam bath until all of the solid had dissolved and the resulting solution was chilled in an ice bath. The resulting precipitate was collected and dried, there being obtained 10.0 g. (78% yield) of the product, 7-chloro-1-(2-chlorobenzyl)-4-(4-diethylaminobutylimino)-1,4-dihydroquinoline hydriodide, M.P. 188–191° C. (uncorr.).

*Anal.*—Calcd. for $C_{28}H_{29}Cl_2N_3 \cdot HI$: $I^-$, 22.7. Found: $I^-$, 22.4.

B. *7-chloro-1-(2-chlorobenzyl)-4-(4-diethylaminobutylimino)-1,4-dihydroquinoline hydrochloride*

7-chloro-1-(2-chlorobenzyl)-4-(4-diethylaminobutylimino)-1,4-dihydroquinoline hydriodide (8.3 g.) was dissolved in 500 cc. of 50% ethanol and passed over a column of 30 g. of an ion-exchange resin saturated with chloride ions (Amberlite ® IRA-400). The column was eluted with water and the combined eluants were distilled in vacuo to remove all of the solvent. The remaining solid was recrystallized from isopropanol to yield 2.9 g. (42%) of product, 7-chloro-1-(2-chlorobenzyl)-4-(4-diethylaminobutylimino)-1,4-dihydroquinoline hydrochloride, M.P. 216.8–226.4° C. (corr.).

*Anal.*—Calcd. for $C_{24}H_{29}Cl_2N_3 \cdot HCl$: $Cl^-$, 7.60; N, 9.00. Found: $Cl^-$, 7.52; N, 8.90.

EXAMPLE 13

*7-chloro-1-(2-chlorobenzyl)-5-(5-diethylaminopentylimino)-1,4-dihydroquinoline dihydrochloride*

This preparation was carried out following the procedure described in Example 11 using 5.4 g. of 7-chloro-1-(2-chlorobenzyl)-4-iodoquinolinium iodide, 5.0 g. of 5-diethylaminopentylamine and 50 cc. of absolute ethanol. There was thus obtained 7-chloro-1-(2-chlorobenzyl)-4-(5-diethylaminopentylimino)-1,4-dihydroquinoline hydriodide which was converted into its imino base and then into the corresponding dihydrochloride, M.P. 231.8–235.4° C. (corr.) when recrystallized from absolute ethanol.

*Anal.*—Calcd. for $C_{25}H_{31}Cl_2N_3 \cdot 2HCl$: $Cl^-$, 12.58; N, 7.40. Found: $Cl^-$, 12.88; N, 7.83.

EXAMPLE 14

*7-chloro-1-(2-chlorobenzyl)-4-(6-diethylaminohexylimino)-1,4-dihydroquinoline*

This preparation was carried out following the procedure described in Example 11 using 14 g. of 7-chloro-1-(2-chlorobenzyl)-4-iodoquinolinium iodide, 7.8 g. of 6-diethylaminohexylamine and 50 cc. of ethanol. There was thus obtained 10 g. (75% yield) of 7-chloro-1-(2-chlorobenzyl)-4-(6-diethylaminohexylimino)-1,4-dihydroquinoline hydriodide which was converted in 100% yield to the corresponding imino compound. This product, 7-chloro-1-(2chlorobenzyl)-4-(6-diethylaminohexylimino)-1,4-dihydroquinoline, melted at 87.0–88.2° C. (corr.) when recrystallized from ethanol-water.

*Anal.*—Calcd. for $C_{26}H_{33}Cl_2N_3$: $N_{AP}$, 6.12; N, 9.18. Found: $N_{AP}$, 6.01; N, 9.03.

EXAMPLE 15

*7-chloro-1-(2-chlorobenzyl)-4-(2-methylaminoethylimino)-1,4-dihydroquinoline dihydrochloride*

Following the procedure described in Example 11 using 5.4 g. of 7-chloro-1-(2-chlorobenzyl)-4-iodoquinolinium iodide, 7.5 g. of 2-methylaminoethylamine and 60 cc. of absolute ethanol. There was thus obtained 3.5 g. of 7-chloro-1-(2-chlorobenzyl)-4-(2-methylaminoethylimino)-1,4-dihydroquinoline hydriodide, M.P. 219–220° C. (uncorr.) when recrystallized from ethanol.

The above-described hydriodide (3.5 g.) was ion-exchanged over 18 g. of an ion-exchange resin saturated with chloride ions (Amberlite ® IRA-400 resin), said resin suspended in hot methanol. There was thus obtained 1.7 g. (61% yield) of 7-chloro-1-(2-chlorobenzyl)-4-(2-methylaminoethylimino)-1,4-dihydroquinoline hydrochloride, 0.9 g. of which was dissolved in absolute ethanol and treated with excess ethanolic hydrogen chloride to give 0.5 g. of 7-chloro-1-(2-chlorobenzyl)-4-(2-methylaminoethylimino)-1,4-dihydroquinoline dihydrochloride, M.P. 226.8–228.6° C. (corr.).

*Anal.*—Calcd. for $C_{19}H_{19}Cl_2N_3 \cdot 2HCl$: $Cl^-$, 16.37; N, 9.70. Found: $Cl^-$, 16.18; N, 9.60.

By substitution of the 2-methylaminoethylamine in the preceding example with an equivalent amount of 4-cyclohexylaminobutylamine, 3-n-propylaminopropylamine or 2-n-hexylaminoethylamine, there can be obtained respectively, 7-chloro-1-(2-chlorobenzyl)-4-(4-cyclohexylaminobutylimino)-1,4-dihydroquinoline dihydrochloride, 7-chloro-1-(2-chlorobenzyl)-4-(3-n-propylaminopropylimino)-1,4-dihydroquinoline dihydrochloride or 7-chloro-1-(2-chlorobenzyl)-4-(2-n-hexylaminoethylimino)-1,4-dihydroquinoline dihydrochloride. Treatment of these dihydrochlorides with an acid-acceptor according to the procedure described in Example 2 yields the respective compounds in free base form.

EXAMPLE 16

*7-chloro - 1 - (2 - chlorobenzyl) - 4 - [2-(2-hydroxyethylamino)ethylimino] - 1,4 - dihydroquinoline dihydrochloride*

A mixture of 27 g. of 7-chloro-1-(2-chlorobenzyl)-4-iodoquinolinium iodide in 200 cc. of ethanol was stirred and warmed on a steam bath while 21 g. of 2-(2-hydroxyethylamino)ethylamine was added. When the reactants had dissolved, the resulting solution was filtered and allowed to stand at room temperature overnight. The precipitate was collected and dried, yielding 25 g. (97%) of 7-chloro-1-(2-chlorobenzyl) - 4-[2-(2-hydroxyethylamino)ethylimino]-1,4-dihydroquinoline hydriodide, M.P. 177–178.5° C. (uncorr.) when recrystallized from ethanol.

The above hydriodide was dissolved in a minimum amount of ethanol and a molar equivalent of 6N ethanolic hydrogen chloride was added. The solution was cooled to yield a precipitate which was collected; this was 7-chloro-1-(2-chlorobenzyl) - 4-[2-(2-hydroxyethylamino)ethylimino] - 1,4 - dihydroquinoline hydrochloride hydriodide, M.P. indefinite.

A solution of this hydrochloride hydriodide in aqueous ethanol (two parts of ethanol) was run through an ion-exchange resin containing an excess of chloride ions (Rohm and Haas Amberlite ® IRA–400 resin); and the eluant was evaporated in vacuo yielding the solid product, 7-chloro-1-(2-chlorobenzyl)-4-[2 - (2 - hydroxyethylamino)ethylimino]-1,4-dihydroquinoline dihydrochloride, M.P. 216.8–219.2° C. (corr.).

*Analysis.*—Calcd. for $C_{20}H_{21}Cl_2N_3O.2HCl$: Cl−, 15.20; N, 9.06. Found: Cl−, 15.04; N, 9.01.

By substitution of the 2-(2-hydroxyethylamino)ethylamine in the preceding example with an equivalent amount of 3-(3-hydroxypropylamino)propylamine, 2-(4-hydroxybutylamino)ethylamine or 4 - (2-hydroxypropylamino)butylamine, there can be obtained, respectively, 7-chloro-1-(2 - chlorobenzyl)-4 - [3 - (3 - hydroxypropylamino)propylimino]-1,4 - dihydroquinoline dihydrochloride, 7-chloro-1 - (2 - chlorobenzyl) - 4 - [2-(4-hydroxybutylamino)ethylimino]-1,4 - dihydroquinoline dihydrochloride or 7-chloro-1-(2-chlorobenzyl)-4 - [4-(2-hydroxypropylamino)butylimino] - 1,4 - dihydroquinoline dihydrochloride. Treatment of these dihydrochlorides with an acid-acceptor according to the procedure described in Example 2 yields the respective compounds in free base form.

EXAMPLE 17

*7-chloro - 1 - (2,4 - dichlorobenzyl) - 4 - (2-diethylaminoethylimino) - 1,4 - dihydroquinoline hydrochloride*

This preparation was carried out following the procedure described in Example 1B using 10.0 g. of 7-chloro-4-(2-diethylaminoethylamino)quinoline, 7.0 g. of 2,4-dichlorobenzyl chloride, 50 cc. of acetonitrile and a reflux period of five hours. There was thus obtained 7.3 g. of 7-chloro - 1 - (2,4 - dichlorobenzyl) - 4-(2-diethylaminoethylimino) - 1,4-dihydroquinoline hydrochloride, M.P. 231.4–236.8° C. (corr.) when recrystallized from isopropanol and dried in a vacuum over for seventy-two hours.

*Analysis.*—Calcd. for $C_{22}H_{24}Cl_3N_3.HCl$: Cl−, 7.49; N, 8.88. Found: Cl−, 7.52; N, 8.60.

EXAMPLE 18

A. *1 - (lower-alkyl) - 4 - haloquinolinium halides*

The preparation of these compounds is illustrated by the following synthesis of 7 - chloro - 4-iodo-1-methylquinolinium iodide: A reaction mixture containing 40 g. of 4,7-dichloroquinoline, 57 g. of methyl iodide and 400 cc. of acetone was allowed to stand at room temperature for four days. The solid which had separated was collected and recrystallized from methanol-water, yielding 33 g. (38%) of 7 - chloro-4-iodo-1-methylquinolinium iodide, M.P. 265–266° C. (uncorr.) with decomposition.

*Analysis.*—Calcd. for $C_{10}H_8ClI_2N$: C, 27.82; H, 1.86; I−, 29.93. Found: C, 28.08; H, 1.86; I−, 30.50.

When the above reaction was repeated using twice the quantity of methyl iodide and 29 g. of sodium iodide, the yield was 56 g. (65%), M.P. 264–265° C. (uncorr.).

By substitution of an equivalent quantity of 4,5-dichloroquinoline for 4,7-dichloroquinoline in the above procedure, the product obtained was 5-chloro-4-iodo-1-methylquinolinium iodide, M.P. 248–250° C.

Other 1-(lower-alkyl)-4-haloquinolinium iodides that can be prepared following the above procedure using the appropriate 4-haloquinoline and lower-alkyl iodide (or other lower-alkyl halides and sodium iodide as in Example 6A) include: 3,7 - dichloro-4-iodo-1-methyl-quinolinium iodide using 3,4,7 - trichloroquinoline and methyl iodide; 6,7 - dichloro-1 - ethyl-4-iodoquinolinium iodide using 4,6,7-trichloroquinoline and ethyl iodide; 7-bromo-4-iodo-1 - methylquinolinium iodide using 4,7-dibromoquinoline, methyl iodide and sodium iodide; 8-chloro-4 - iodo - 1 - isopropylquinolinium iodide using 4,8-dichloroquinoline and isopropyl iodide; 4-iodo-1-n-propyl-7-trifluoromethylquinolinium iodide using 4-chloro-7-trifluoromethylquinoline and n-propyl iodide; 4 - iodo-1-n-hexyl-3-nitroquinolinium iodide using 4 - chloro - 3-nitroquinoline and n-hexyl iodide; 6,8-dimethoxy-1-ethyl-4-iodoquinolinium iodide using 4-chloro-6,8-dimethoxyquinoline and ethyl iodide; 8-n-butoxy-4-iodo-1-isobutylquinolinium iodide using 8 - n-butoxy-4-chloroquinoline and isobutyl iodide; 6-n-hexoxy-4-iodo-1-methylquinolinium iodide using 4-chloro-6-n-hexoxyquinoline and methyl iodide; 1-ethyl - 4 - iodo-7-methylmercaptoquinolinium iodide using 4-chloro-7 - methylmercaptoquinoline and ethyl iodide; 1-ethyl - 4 - iodo-8-isobutylmercaptoquinolinium iodide using 4-chloro-8-isobutylmercaptoquinoline and ethyl iodide; 7-chloro-4-iodo - 6-methoxy-1-methylquinolinium iodide using 4,7-dichloro-6-methoxyquinoline and methyl iodide; 7-n-butyl-4-iodo-1-methylquinolinium iodide using 7-n-butyl - 4 - chloroquinoline and methyl iodide; and the like.

B. *1-(lower-alkyl) - 4 - [lower-(tertiary-amino)-alkylimino]-1,4-dihydroquinolines*

The preparation of these compounds in the form of their acid-addition salts is illustrated by the following preparation of the hydriodide of 7-chloro-4-(2-diethylaminoethylimino)-1-methyl-1,4-dihydroquinoline: A mixture of 17 g. of 7 - chloro-4-iodo-1-methylquinolinium iodide and 17.6 g. of 2-diethylaminoethylamine in 250 cc. of anhydrous ethanol was stirred for several minutes and a small amount of insoluble material was removed by filtration. The filtrate was allowed to stand overnight at room temperature and then stirred for about sixteen hours. The solid which separated was collected (10 g.) by filtration. An additional crop (2 g.) was obtained by concentrating the filtrate. This product, 7-chloro-4-(2-diethylaminoethylimino) - 1-methyl - 1,4 - dihydroquinoline hydriodide, melted at 177.0–178.4° C. (corr.) when recrystallized twice from ethanol.

*Anal.*—Calcd. for $C_{16}H_{22}ClN_3.HI$: I−, 30.22; N, 10.01. Found: I−, 29.8; N, 9.86.

Other 1-(lower-alkyl)-4-[lower-(tertiary-amino)-alkylimino]-1,4-dihydroquinolines that can be prepared following the above procedure using the appropriate reactants include: 3,7-dichloro-4-(2-diethylaminoethylimino)-1-methyl-1,4-dihydroquinoline hydriodide using 3,7-dichloro-4-iodo-1-methylquinolinium iodide and 2-diethylaminoethylamine; 6,7-dichloro-4-[2-(1-piperidyl)ethylimino]-1-ethyl-1,4-dihydroquinoline hydroiodide using 6,7-dichloro-1-ethyl-4-iodoquinolinium iodide and 2-(1-piperidyl)ethylamine; 7-bromo-4-(2-di-n-hexylaminoethylimino)-1-methyl-1,4-dihydroquinoline hydriodide using 7-bromo-4-iodo-1-methylquinolinium iodide and 2-di-n-hexylaminoethylamine; 8-chloro-4-[3-(1-pyrrolidyl)propylimino]-1-isopropyl-1,4-dihydroquinoline hydriodide using 8-chloro-4-iodo-1-isopropylquinolinium iodide and 3-

(1-pyrrolidyl)propylamine; 4-(2-diethylaminoethylimino)-1-n-propyl-7-trifluoromethyl-1,4-dihydroquinoline hydriodide using 4-iodo-1-n-propyl-7-trifluoromethylquinolinium iodide and 2-diethylaminoethylamine; 4-[2-(N-ethyl-N-2-hydroxyethylamino)ethylimino]-1 - n - hexyl-3-nitro-1,4-dihydroquinoline hydriodide using 4-iodo-1-n-hexyl-3-nitroquinolinium iodide and 2-(N-ethyl-N-2-hydroxyethylamino)ethylamine; 6,8-dimethoxy-1-ethyl-4-[2-(4-methyl-1-piperidyl)ethylimino]-1,4 - dihydroquinoline hydriodide using 6,8-dimethoxy-1-ethy-4-iodoquinolinium iodide and 2-(4-methyl-1-piperidyl)ethylamine; 4-[2-(N-benzyl-N-ethylamino)ethylimino] - 8-n-butoxy-1-isobutyl-1,4-dihydroquinoline hydriodide using 8-n-butoxy-4-iodo-1-isobutylquinolinium iodide and 2-(N-benzyl-N-ethylamino)ethylamine; 4-(2 - dimethylaminoethylimino)-6-n-hexoxy-1-methyl - 1,4 - dihydroquinoline hydriodide using 6-n-hexoxy-4-iodo-1-methylquinolinium iodide and 2-dimethylaminoethylamine; 4-[3-(N-cyclohexyl-N-methylamino)propylimino]-1-ethyl-7-methylmercapto-1,4-dihydroquinoline hydriodide using 1-ethyl-4-iodo-7-methylmercaptoquinolinium iodide and 3-(N-cyclohexyl-N-methylamino)propylamine; 1-ethyl-4-[2-(N-ethyl-N-methylamino)ethylimino] - 8-isobutylmercapto-1,4-dihydroquinoline hydriodide using 1-ethyl-4-iodo-8-isobutylmercaptoquinolinium iodide and 2-(N-ethyl-N-methylamino)ethylamine; 7-chloro-4-(2-diethylaminoethylimino)-6-methoxy-1-methyl-1,4-dihydroquinoline hydriodide using 7-chloro-4-iodo-6-methoxy-1-methylquinolinium iodide and 2-diethylaminoethylamine; 7-n-butyl-4-(2-diethylaminoethylimino)-1-methyl-1,4 - dihydroquinoline hydriodide using 7-n-butyl-4-iodo-1-methylquinolinium iodide and 2-diethylaminoethylamine; and the like. These compounds are readily converted into their base form by reaction with an acid-acceptor according to the procedure given in Example 19 wherein 7-chloro-4-(2-diethylaminoethylimino)-1-methyl-1,4-dihydroquinoline hydriodide is reacted with aqueous sodium hydroxide solution to yield 7-chloro-4-(2-diethylaminoethylimino)-1-methyl-1,4-dihydroquinoline.

EXAMPLE 19

*7-chloro-4-(2-diethylaminoethylimino)-1-methyl-1,4-dihydroquinoline*

To a solution containing 3.5 g. of 7-chloro-4-(2-diethylaminoethylimino)-1-methyl-1,4-dihydroquinoline hydriodide in about 50 cc. of water was added an excess of 10% aqueous sodium hydroxide solution. The precipitate was collected, dried and recrystallized from n-hexane to yield the product, 7-chloro-4-(2-diethylaminoethylimino)-1-methyl-1,4-dihydroquinoline, M.P. 77.6–78.8° C. (corr.).

*Anal.*—Calcd. for $C_{16}H_{22}ClN_3$: C, 65.90; H, 7.58; N, 14.40. Found: C, 65.60; H, 7.46; N, 14.13.

One-half gram of 7-chloro-4-(2-diethylaminoethylimino)-1-methyl-1,4-dihydroquinoline in 20 cc. of acetone was treated with twenty drops of 47% aqueous hydriodic acid. The precipitate was collected and washed with acetone, yielding 1.2 g. of 7-chloro-4-(2-diethylaminoethylimino)-1-methyl-1,4-dihydroquinoline dihydriodide, M.P. 263–264° C. (uncorr.) with decomposition.

*Anal.*—Calcd. for $C_{16}H_{22}ClN_3 \cdot 2HI$: I⁻, 46.3. Found: I⁻, 45.2.

By substitution of the hydriodic acid in the preceding example with an excess of hydrogen chloride, hydrogen bromide, phosphoric acid, sulfuric acid, methanesulfonic acid or tartaric acid, there can be obtained 7-chloro-4-(2-diethylaminoethylimino)-1-methyl-1,4 - dihydroquinoline dihydrochloride, dihydrobromide, diphosphate, disulfate, dimethanesulfonate or ditartrate, respectively.

EXAMPLE 20

*7-chloro-1-methyl-4-(2-methylaminoethylimino)-1,4-dihydroquinoline dihydrochloride*

7-chloro-1-methyl-4-(2-methylaminoethylimino) - 1,4-dihydroquinoline hydriodide was prepared following the procedure described in Example 18B using 8.6 g. of 7-chloro-4-iodo-1-methylquinolinium iodide, 7.5 g. of 2-methylaminoethylamine and 50 cc. of absolute ethanol. This product was obtained in 60% yield (4.5 g.), M.P. 208–210° C. (uncorr.) with decomposition.

The above-described hydriodide (4 g.) was treated with one equivalent of alcoholic hydrogen chloride to give the corresponding 7-chloro-1-methyl-4-(2-methylaminoethylimino)-1,4-dihydroquinoline hydriodide hydrochloride in solution and the solution was ion-exchanged through 30 g. of an ion-exchange resin saturated with chloride ions (Amberlite® IRA–400 resin), said resin suspended in methanol. There was thus obtained 3.1 g. (91% yield) of the product, 7-chloro-1-methyl-4-(2-methylaminoethylimino)-1,4-dihydroquinoline dihydrochloride, M.P. 283–285° C. (uncorr.) with decomposition. Recrystallization of this product from isopropanol-absolute ethanol gave 1.7 g., M.P. 283.2–285.4° C. (corr.) with decomposition.

*Anal.*—Calcd. for $C_{13}H_{16}ClN_3 \cdot 2HCl$: Cl⁻, 21.98; N, 13.02. Found: Cl⁻, 21.56; N, 12.92.

By substitution of the 2-methylaminoethylamine in the preceding example with an equivalent quantity of 4-cyclohexylaminobutylamine, 2 - (2-hydroxyethylamino)ethylamine, 3-n-propylaminopropylamine or 2-n-hexylaminoethylamine, there can be obtained, respectively, 7-chloro-4-(4-cyclohexylaminobutylimino)-1-methyl - 1,4-dihydroquinoline dihydrochloride, 7-chloro-4-[2-(2-hydroxyethylamino)ethylimino]-1-methyl-1,4-dihydroquinoline dihydrochloride, 7-chloro-1-methyl-4-(3-n-propylaminopropylimino)-1,4-dihydroquinoline dihydrochloride or 7-chloro-4-(2-n-hexylaminoethylimino) - 1 - methyl - 1,4 - dihydroquinoline dihydrochloride. Treatment of these dihydrochlorides with an acid-acceptor according to the procedure described in Example 19 yields the respective compounds in free base form.

EXAMPLE 21

*7-chloro-4-[2-(N-2-chlorobenzyl-N-ethylamino)ethylimino]-1-methyl-1,4-dihydroquinoline hydriodide*

This preparation was carried out following the procedure described in Example 18B using 13.0 g. of 7-chloro-4-iodo-1-methylquinolinium iodide, 19.0 g. of 2-(N-2-chlorobenzyl-N-ethylamino)ethylamine and 100 cc. of anhydrous ethanol. There was thus obtained 14.5 g. (94% yield) of the product, 7-chloro-4-[2-(N-2-chlorobenzyl-N-ethylamino)ethylimino]-1-methyl-1,4-dihydroquinoline hydriodide, M.P. 211.0–213.4° C. (corr.).

*Anal.*—Calcd. for $C_{21}H_{23}Cl_2N_3 \cdot HI$: I⁻, 24.62; N, 8.15. Found: I⁻, 24.9; N, 7.88.

By substitution of 2-(N-2-chlorobenzyl-N-ethylamino)ethylamine in the preceding example by a molar equivalent of 2-(N-2-nitrobenzyl-N-ethylamino)ethylamine, 2-(N-2,4-dimethoxybenzyl-N-ethylamino)ethylamine, 3-(N-3-ethylbenzyl-N-methylamino)propylamine, 2-(N - 3 - trifluoromethylbenzyl-N-ethylamino)ethylamine, 2 - (N - 2-methylmercaptobenzyl - N - ethylamino)ethylamine or 4-(N-2,4,6-trichlorobenzyl-N-ethylamino)butylamine, there can be obtained, respectively, 7-chloro-4-[2-(N-2-nitrobenzyl-N-ethylamino)ethylimino]-1-methyl-1,4 - dihydroquinoline hydriodide, 7-chloro-4-[2-(N - 2,4 - dimethoxybenzyl-N-ethylamino)ethylimino]-1-methyl-1,4 - dihydroquinoline hydriodide, 7-chloro-4-[3-(N-3-ethylbenzyl-N-methylamino)propylimino]-1-methyl-1,4-dihydroquinoline hydriodide, 7 - chloro-4-[2-(N-3-trifluoromethylbenzyl-N-ethylamino)ethylimino]-1-methyl - 1,4 - dihydroquinoline hydriodide, 7-chloro-4-[2-(N-2-methylmercaptobenzyl-N-ethylamino)ethylimino]-1-methyl - 1,4 - dihydroquinoline hydriodide or 7-chloro-4-[4-(N-2,4,6-trichlorobenzyl-N-ethylamino)butylimino]-1-methyl - 1,4 - dihydroquinoline hydriodide. Treatment of these hydriodides with an acid-acceptor yields the corresponding compounds in free base form, e.g., 7-chloro-4-[2-(N-2-nitrobenzyl-N-ethylamino)ethylimino]-1-methyl-1,4-dihydroquinoline, etc.

EXAMPLE 22

*7-chloro-1-methyl-4-[2-(4-morpholinyl)ethylimino]-1,4-dihydroquinoline hydriodide*

This preparation was carried out following the procedure described in Example 18A using 4.3 g. of 7-chloro-4-iodo-1-methylquinolinium iodide, 5.2 g. of 2-(4-morpholinyl)ethylamine and 25 cc. of anhydrous ethanol. There was thus obtained 4.3 g. of the product, 7-chloro-1-methyl-4-[2-(4-morpholinyl)ethylimino]-1,4 - dihydroquinoline hydriodide, M.P. 243.8–245.6° C. (corr.) when recrystallized from ethanol.

*Anal.*—Calcd. for $C_{16}H_{20}ClN_3O.HI$: I⁻, 29.38; N, 9.66. Found: I⁻, 29.2; N, 9.57.

EXAMPLE 23

*7-chloro-1-methyl-4-[2-(1-piperazinyl)ethylimino]-1,4-dihydroquinoline*

Following the procedure described in Example 19 using 17.2 g. of 7-chloro-4-iodo-1-methylquinolinium iodide, 20.7 g. of 2-(1-piperazinyl)ethylamine and 120 cc. of anhydrous ethanol, there was obtained 14 g. (81% yield) of 7-chloro-1-methyl-4-[2-(1-piperazinyl)ethylimino] - 1,4-dihydroquinoline hydriodide.

Treatment of the above-described hydriodide as in Example 19 gave 8.5 g. (88% yield) of 7-chloro-1-methyl-4-[2-(1-piperazinyl)ethylimino]1,4-dihydroquinoline, M.P. 123.4–126.2° C. (corr.).

*Anal.*—Calcd. for $C_{16}H_{21}ClN_4$: Cl, 11.62; N, 18.38. Found: Cl, 11.80; N, 18.43.

EXAMPLE 24

*5-chloro-1-methyl-4-(2-methylaminoethylimino)-1,4-dihydroquinoline dihydrochloride*

This preparation was carried out following the procedure described in Example 20 using 8.6 g. of 5-chloro-4-iodo-1-methylquinolinium iodide, 7.5 g. of 2-methylaminoethylamine and 50 cc. of ethanol. There was thus obtained 5-chloro-1-methyl-4-(2-methylaminoethylimino)-1,4-dihydroquinoline hydriodide which was treated with one equivalent of ethanolic hydrogen chloride to form the corresponding hydriodide hydrochloride, which was ion-exchanged as in Example 20 to yield 2.0 g. of 5-chloro-1-methyl-4-(2-methylaminoethylimino)-1,4 - dihydroquinoline dihydrochloride, M.P. 262.2–263.2° C. (corr.).

*Anal.*—Calcd. for $C_{13}H_{16}ClN_3.2HCl$: Cl⁻, 21.98; N, 13.02. Found: Cl⁻, 21.73; N, 12.95.

EXAMPLE 25

*5-chloro-4-(2-diethylaminoethylimino)-1-methyl-1,4-dihydroquinoline dihydriodide*

Following the procedure described in Example 18B using 12.9 g. of 5-chloro-4-iodo-1-methylquinolinium iodide, 13.9 g. of 2-diethylaminoethylamine and 100 cc. of absolute ethanol, there was obtained 3 g. of 5-chloro-4-(2-diethylaminoethylimino) - 1 - methyl - 1,4 - dihydroquinoline hydriodide, M.P. 146–149° C. (uncorr.) when recrystallized from ethanol.

*Anal.*—Calcd. for $C_{16}H_{22}ClN_3.HI$: I⁻, 30.20; N, 10.02. Found: I⁻, 29.20; N, 9.80.

The above monohydriodide was dissolved in 20 cc. of methanol; 3 cc. of 48% hydriodic acid was added; and the product slowly precipitated. There was thus obtained 2.5 g. of 5-chloro-4-(2-diethylaminoethylimino)-1-methyl-1,4-dihydroquinoline dihydriodide, M.P. 225.0–227.4° C. (corr.).

*Anal.*—Calcd. for $C_{16}H_{22}ClN_3.2HI$: I⁻, 46.40; N, 7.65. Found: I⁻, 46.25; N, 7.74.

EXAMPLE 26

*5-chloro-1-methyl-4-[2-(4-morpholinyl)ethylimino]-1,4-dihydroquinoline dihydriodide*

Following the procedure described in Example 25 using 13 g. of 5-chloro-4-iodo-1-methylquinolinium iodide, 12 g. of 2-(4-morpholinyl)ethylamine and 150 cc. of anhydrous ethanol, there was obtained 13 g. (99% yield) of 5-chloro-1-methyl-4-[2-(4-morpholinyl)ethylimino] - 1,4-dihydroquinoline hydriodide, M.P. 187–188° C. (uncorr.) when recrystallized from methanol.

*Anal.*—Calcd. for $C_{16}H_{20}ClN_3O.HI$: I⁻, 29.38. Found: $H_2O$, 0.83; I⁻, 29.15 (D.B.).

The corresponding dihydriodide, prepared as in Example 25, melted at 248.0–250.2° C. (corr.) when recrystallized from methanol.

*Anal.*—Calcd. for $C_{16}H_{20}ClN_3O.2HI$: I⁻, 45.20; N, 7.48. Found: I⁻, 45.10; N, 7.29.

EXAMPLE 27

*7-chloro-4-(6-diethylaminohexylimino)-1-methyl-1,4-dihydroquinoline*

Following the procedure described in Example 18B using 9.0 g. of 7-chloro-4-iodo-1-methylquinolinium iodide and 6.3 g. of 6-diethylaminohexylamine, there was obtained 6.5 g. (78% yield) of 7-chloro-4-(6-diethylaminohexylimino)-1-methyl - 1,4 - dihydroquinoline hydriodide, M.P. 179–182° C. (uncorr.).

7-chloro-4-(6-diethylaminohexylimino)-1-methyl - 1,4-dihydroquinoline was obtained from the above hydriodide following the procedure described in Example 19. There was thus obtained 7-chloro-4-(6-diethylaminohexylimino)-1-methyl-1,4-dihydroquinoline, M.P. 72.4–75.4° C. (corr.) when recrystallized from n-hexane.

*Anal.*—Calcd. for $C_{20}H_{30}ClN_3$: $N_{AP}$, 8.05; N, 12.07. Found: $N_{AP}$, 8.05; N, 11.93.

EXAMPLE 28

*7-chloro-4-(1,1-dimethyl-2-isopropylaminoethylimino)-1-methyl-1,4-dihydroquinoline hydriodide*

This preparation was carried out following the procedure described in Example 18B using 14.0 g. of 7-chloro-4-iodo-1-methylquinolinium iodide and 13.0 g. of 1,1-dimethyl-2-isopropylaminoethylamine. There was thus obtained 4.5 g. of the product, 7-chloro-4-(1,1-dimethyl-2-isopropylaminoethylimino) - 1 - methyl - 1,4 - dihydroquinoline hydriodide, M.P. 204.8–206.2° C. (corr.) when recrystallized from isopropanol.

*Anal.*—Calcd. for $C_{17}H_{24}ClN_3.HI$: I⁻, 29.26; N, 9.69. Found: I⁻, 28.9; N, 9.53.

EXAMPLE 29

*1-benzyl-4-(2-diethylaminoethylimino)-1,4-dihydroquinoline hydrochloride*

Following the procedure described in Example 1B using 7.0 g. of 4-(2-diethylaminoethylamino)quinoline, 4.2 g. of benzyl chloride, 60 cc. of acetonitrile and a reflux period of eighteen hours, there was obtained the product, 1 - benzyl - 4 - (2 - diethylaminoethylimino) - 1,4 - dihydroquinoline hydrochloride, M.P. 166.2–168.0° C. (corr.) when recrystallized from isopropanol ether.

*Anal.*—Calcd. for $C_{22}H_{27}N_3.HCl$: Cl⁻, 9.59; N, 11.36. Found: Cl⁻, 9.62; N, 11.14.

EXAMPLE 30

*1-(2-chlorobenzyl)-4-(2-diethylaminoethylimino)-1,4-dihydroquinoline hydrochloride*

Following the procedure described in Example 1B using 5.0 g. of 4-(2-diethylaminoethylamino)quinoline, 3.2 g. of 2-chlorobenzyl chloride, 25 cc. of acetonitrile and a reflux period of twenty-four hours, there was obtained 2.85 g. of the product, 1-(2-chlorobenzyl)-4-(2-diethylaminoethylimino) - 1,4 - dihydroquinoline hydrochloride, M.P. 162.0–164.6° C. (corr.) when recrystallized twice from ethanol-ethyl acetate.

*Anal.* — Calcd. for $C_{22}H_{26}ClN_3.HCl$: Cl⁻, 8.77; N, 10.39. Found: Cl⁻, 8.82; N, 10.23.

EXAMPLE 31

5-chloro-1-(2-chlorobenzyl)-4-(3-diethylaminopropylimino)-1,4-dihydroquinoline Following the procedure described in Example 6B using 10.0 g. of 5-chloro-1-(2-chlorobenzyl)-4-iodoquinolinium iodide, 7.5 g. of 3-diethylaminopropylamine, 150 ml. of ethanol and a heating period of about ten minutes on a steam bath, there was obtained 9 g. of 5-chloro-1-(2-chlorobenzyl) - 4 - (3 - diethylaminopropylimino) - 1,4-dihydroquinoline hydriodide, M.P. 192–193° C. (uncorr.).

Following the procedure described in Example 2, the above hydriodide was converted into the corresponding imino base, 5 - chloro - 1 - (2 - chlorobenzyl) - 4 - (3 - diethylaminopropylimino) - 1,4 - dihydroquinoline, M.P. 114.0–115.4° C. (corr.) when recrystallized from isopropanol.

Anal.—Calcd. for $C_{23}H_{27}Cl_2N_3$: $N_{AP}$, 6.74; N, 10.10. Found: $N_{AP}$, 6.71; N, 10.10.

Pharmacological evaluation of the compounds of the invention have shown them to possess hypotensive properties as measured by the serial carotid occlusion procedure in anesthetized dogs.

The compounds of the invention can be formulated for use in the same way as conventional hypotensive agents, such as reserpine preparations, and indeed can be used advantageously in combination with such agents. They can be formulated into tablets or capsules for oral administration or dissolved under sterile conditions for parenteral injection.

I claim:

1. A composition of matter selected from the group consisting of: (a) a compound having the formula

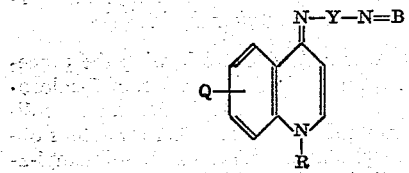

where Q is selected from the group consisting of H and from one to two substituents at positions 3, 5, 6, 7 and 8 of the quinoline nucleus selected from the group consisting of halo, lower-alkoxy, lower-alkylmercapto, lower-alkyl, nitro and trifluoromethyl, Y is lower-alkylene having its connecting linkages on different carbon atoms, N=B is a member selected from the group consisting of mono-(lower-cycloalkyl)amino, mono-(lower-hydroxyalkyl)amino, mono-(lower-alkyl)amino, mono-[(monocarbocyclic-aryl)methyl]amino, di-(lower-alkyl)amino, N - [(monocarbocyclic - aryl)methyl] - N - (lower-alkyl)amino, N-(lower-alkyl)-N-(lower-hydroxyalkyl)-amino, N-(lower-alkyl)-N-(lower-cycloalkyl)amino, 1-piperidyl, (lower-alkylated)-1-piperidyl, 1-pyrrolidyl, (lower-alkylated)-1-pyrrolidyl, 4-morpholinyl, 1-piperazyl, and (lower-alkylated)-1-piperazyl, and R is a member selected from the group consisting of lower-alkyl and (monocarbocyclic-aryl)methyl, wherein (monocarbocyclic-aryl)methyl in each instance represents a member selected from the group consisting of benzyl, nitrobenzyl, (lower-alkoxylated)-benzyl, (lower-alkylated)-benzyl, halogenated-benzyl, trifluoromethylbenzyl and (lower-alkylmercapto)-benzyl; and, (b) pharmacodynamically acceptable acid-addition salts thereof.

2. A compound having the structural formula

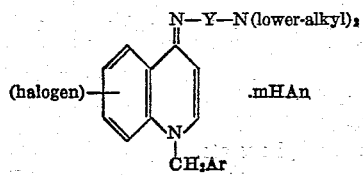

where Y is lower-alkylene having its connecting linkages on different carbon atoms, m is an integer from one to two, Ar is halophenyl and An is a pharmacodynamically acceptable anion.

3. A compound having the structural formula

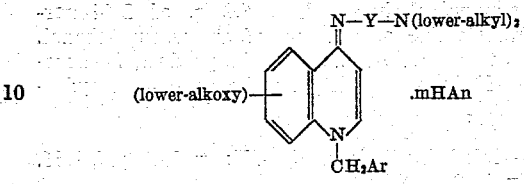

where Y is lower-alkylene having its connecting linkages on different carbon atoms, m is an integer from one to two, Ar is halophenyl and An is a pharmacodynamically acceptable anion.

4. A compound having the structural formula

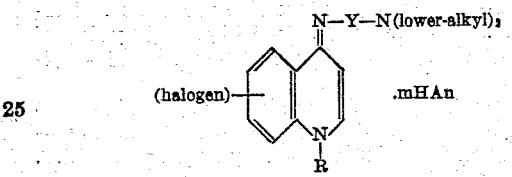

where Y is lower-alkylene having its connecting linkages on different carbon atoms, m is an integer from one to two, R is lower-alkyl and An is a pharmacodynamically acceptable anion.

5. A compound having the structural formula

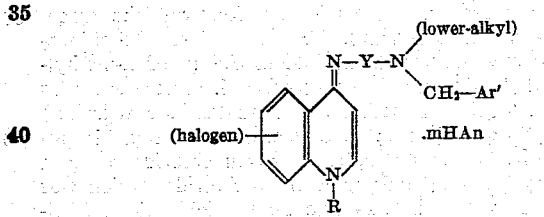

where Y is lower-alkylene having its connecting linkages on different carbon atoms, Ar' is halophenyl, m is an integer from one to two, R is lower-alkyl and An is a pharmacodynamically acceptable anion.

6. A pharmacodynamically acceptable acid-addition salt of 7-chloro-1-(2-chlorobenzyl)-4-(2-diethylaminoethylimino)-1,4-dihydroquinoline.

7. 7 - chloro - 1 - (2 - chlorobenzyl) - 4 - (2 - diethylaminoethylimino)-1,4-dihydroquinoline.

8. A pharmacodynamically acceptable acid-addition salt of 1-(2-chlorobenzyl)-4-(2-diethylaminoethylimino)-6-methoxy-1,4-dihydroquinoline.

9. A pharmacodynamically acceptable acid-addition salt of 7-chloro-4-(2-diethylaminoethylimino)-1-methyl-1,4-dihydroquinoline.

10. 7 - chloro - 4 - (2 - diethylaminoethylimino) - 1-methyl-1,4-dihydroquinoline.

11. A pharmacodynamically acceptable acid-addition salt of 7-chloro-4-[2-(N-ethyl-N-2-chlorobenzylamino)ethylimino]-1-methyl-1,4-dihydroquinoline.

References Cited in the file of this patent

UNITED STATES PATENTS

| | | |
|---|---|---|
| 2,454,949 | Shonle et al. | Nov. 30, 1948 |
| 2,526,417 | Reitsema | Oct. 17, 1950 |

OTHER REFERENCES

Surrey et al.: Jour. Am. Chem. Soc., vol. 68, pp. 1244–1246 (1946).